United States Patent
Stangl et al.

(10) Patent No.: US 6,325,545 B1
(45) Date of Patent: Dec. 4, 2001

(54) RELUBRICATABLE IDLER BUSHING ASSEMBLY

(76) Inventors: Richard J. Stangl, 5029 Hwy Y; Frank E. Stangl, 317 Deer Ridge Dr., both of West Bend, WI (US) 53095

( * ) Notice: Subject to any disclaimer, the term of this patent is extended or adjusted under 35 U.S.C. 154(b) by 0 days.

(21) Appl. No.: 09/497,384

(22) Filed: Feb. 3, 2000

(51) Int. Cl.⁷ ............................................. F16C 33/66
(52) U.S. Cl. ........................................ 384/462; 384/473
(58) Field of Search ................................. 384/473, 474, 384/546, 547, 587, 588; 474/91, 101, 133, 135, 136, 138

(56) References Cited

U.S. PATENT DOCUMENTS

| | | | |
|---|---|---|---|
| 2,272,757 | * 2/1942 | Teker | 384/473 X |
| 3,399,003 | * 8/1968 | Jansson | 384/546 |
| 3,762,784 | * 10/1973 | Pachuta | 384/473 |
| 4,262,978 | 4/1981 | Everett | 384/132 |
| 4,317,599 | 3/1982 | Anderson | 384/474 |
| 4,408,808 | * 10/1983 | Redmann, Jr. et al. | 384/473 |
| 4,919,253 | 4/1990 | Morrison | 198/501 |
| 5,372,434 | 12/1994 | Roberts et al. | 384/391 |
| 5,823,293 | * 10/1998 | Gilbertson et al. | 384/474 X |

FOREIGN PATENT DOCUMENTS 57-208317-A * 12/1982 (JP) ..................................... 384/474

* cited by examiner

*Primary Examiner*—Thomas R. Hannon
(74) *Attorney, Agent, or Firm*—Reinhart, Boerner, Van Deuren, Norris & Rieselbach, s.c.

(57) ABSTRACT

A relubricatable idler bushing assembly includes an idler bushing having a hub which is dimensioned to receive an idler pulley. The idler bushing is journaled to an inner bushing by bearings which are disposed in fluid communication with a lubricant passageway. The inner bushing is mounted on a spindle adapted to mount the idler bushing assembly to a support surface. The spindle includes and axial passageway and a radial bore communicating the axial passageway with the exterior of the spindle. One end of the spindle is adapted to be connected to a source of lubricant under pressure for supplying the lubricant to an axial passageway. The radial bore is communicated through a radial bore of the inner bushing with the lubricant passageway to allow lubricant supplied to the spindle to be flow to the lubricant passageway.

14 Claims, 3 Drawing Sheets

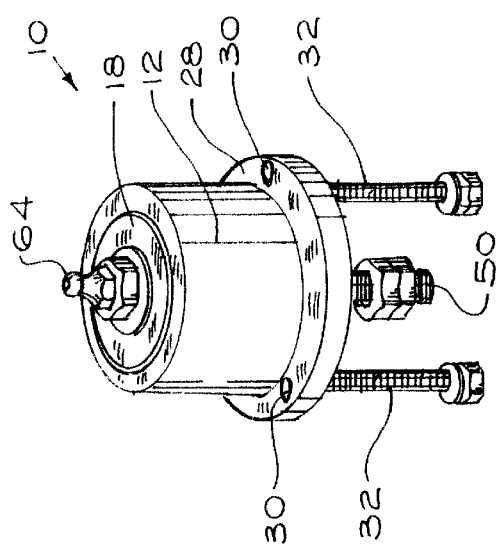
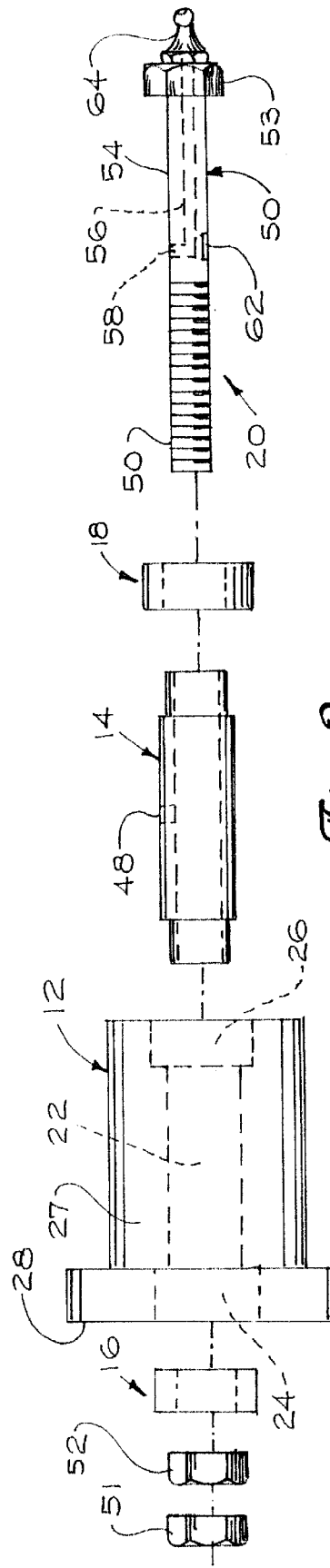

RELUBRICATABLE IDLER BUSHING ASSEMBLY

BACKGROUND OF THE INVENTION

This invention relates generally to relubrication of rotatably supported elements and, more particularly, to the relubrication of a self-contained idler bushing used in a machine.

Idler bushings are used to rotatably support elements, such as pulleys and sprockets, in applications such as belt tensioners and the like. In such applications, the idler bushing is journaled on a spindle which is fixed to the frame of the machinery, allowing the idler bushing and the pulley or sprocket carried by the idler bushing to rotate freely. In many environments, the presence of dust and moisture make it necessary to lubricate the idler bushing periodically. This requires at least partial disassembly of the idler bushing installation to access the idler bushing.

Relubable devices are known for relubricating bearings in applications in which an outer member is journaled on an inner member. Such devices can include a mounting bolt which is drilled axially and tapped and fitted with a grease fitting. Grease can be forced into the bearing by way of the axial passage and a cross-drilled passage in the idler race. However, known idler bushing installations include a spacer member interposed between the spindle and the idler bushing which precludes passage of lubricant from the spindle to the bearings.

SUMMARY OF THE INVENTION

The present invention provides a relubricatable idler bushing assembly including an idler bushing, an inner bushing and a spindle. The idler bushing is journaled on the inner bushing and has an axial through bore which defines an inner surface for the idler bushing. The inner bushing extends within the through bore of the idler bushing with an outer surface of the inner bushing spaced apart from the inner surface of the idler bushing, defining a lubricant passageway therebetween. The spindle is dimensioned to be received within a through bore of the inner bushing. The spindle has an axial passageway therein and one end of the spindle is adapted for supplying lubricant under pressure to the axial passageway. The spindle has a radial bore which communicates the axial passageway with the outer surface of the spindle for allowing the axial passageway to be communicated with the lubricant passageway along a fluid flow path which is defined in part by the inner bushing.

In accordance with one embodiment of the invention, the inner bushing includes a radial bore for providing fluid communication between the radial bore of the spindle and the lubricant passageway. The spindle can have an annular groove extending around the outer periphery of the spindle for communicating the radial bore in the spindle and the radial bore in the inner bushing.

In one embodiment, the idler bushing is journaled to the inner bushing by first and second bearings. The bearings are located within recesses at opposite ends of the idler bushing and are communicated with the lubricant passageway to receive lubricant which is introduced through the spindle.

The relubricatable idler bushing assembly provided by the present invention is simple in construction and is characterized by relatively low cost materials and low production costs.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a perspective view of a relubricatable idler bushing assembly provided by the invention;

FIG. 2 is an exploded view of the idler bushing assembly of FIG. 1;

DETAILED DESCRIPTION OF THE PREFERRED EMBODIMENT

Figure 3:
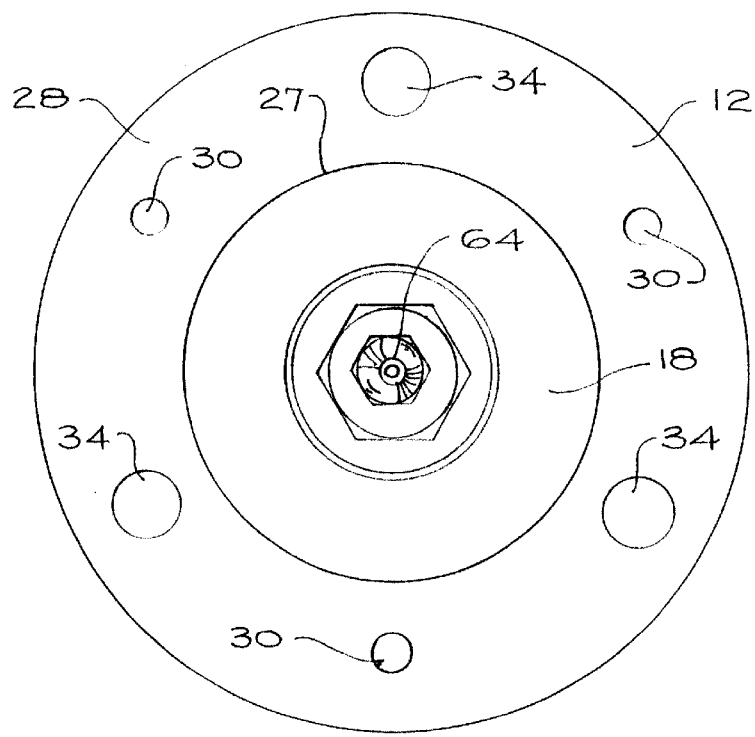
FIG. 3 is an end view of the idler bushing assembly of FIG. 1.

Referring to FIGS. 1 and 2 of the drawings, the relubricatable idler bushing assembly 10 provided by the invention includes an idler bushing 12, an inner bushing 14, a bearing 16, a bearing 18 and a mounting spindle 20. Preferably, the idler bushing 12 is a quick detach (QD) type bushing for allowing quick installation and quick removal of the idler bushing assembly 10.

Figure 4:
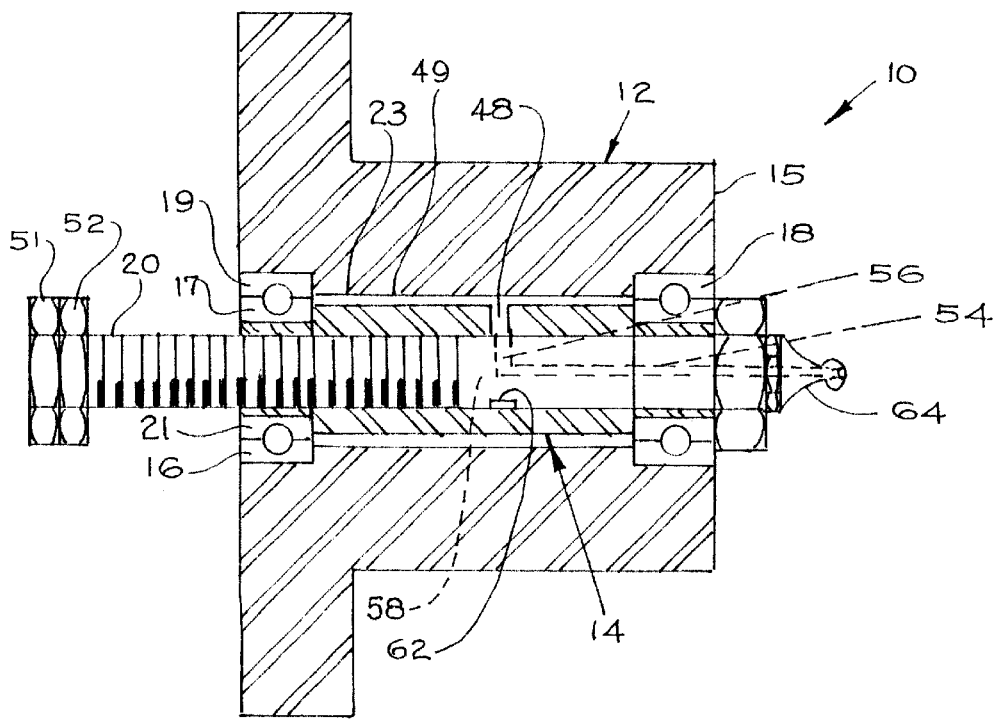
FIG. 4 is a transverse section view of the idler bushing assembly of FIG. 1.
Figure 5:
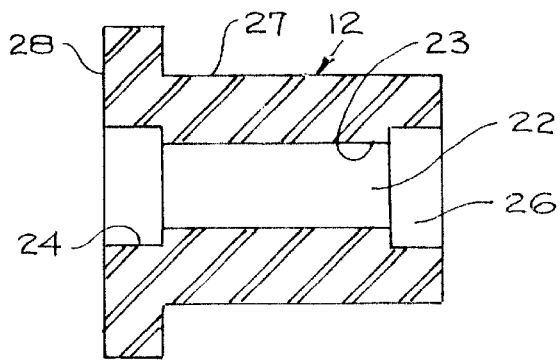
FIG. 5 is a section view of the idler bushing of the idler bushing assembly of FIG. 1.
Figure 6:
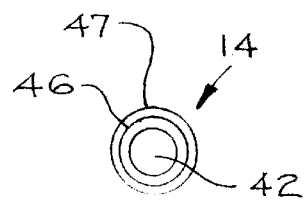
FIG. 6 is an end view of an inner bushing of the idler bushing assembly of FIG. 1.
Figure 7:
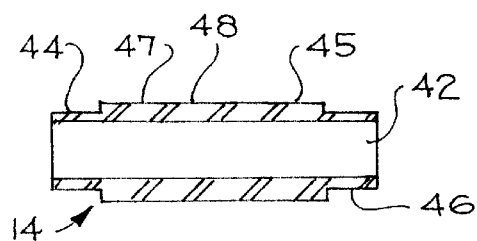
FIG. 7 is a section view of the inner bushing of FIG. 6.
Figure 9:
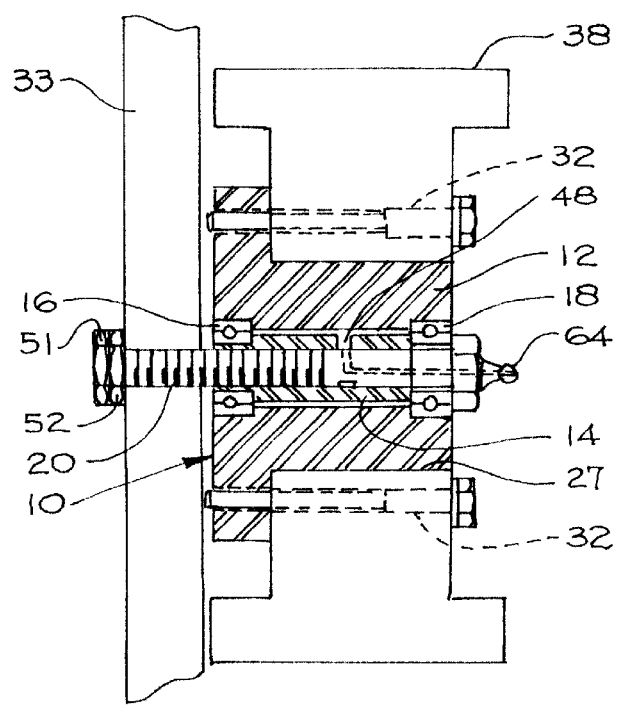
FIG. 9 is a simplified view showing the idler bushing assembly provided by the invention, employed in an application for mounting an idler pulley on a support.

Referring also to FIGS. 3–5, the idler bushing 12 has an axial through bore 22 which is countersunk at each end defining recesses 24 and 26. The idler bushing 12 includes a hub 27 having a mounting flange 28. The mounting flange 28 includes a set of apertures 30 for receiving suitable mounting hardware, such as machine screws 32 as shown in FIG. 9 wherein the idler bushing assembly 10 mounts an idler sprocket or pulley 38, for example, to rotate freely with respect to a frame member 33, or the like, of machinery with which the idler bushing assembly is used. The mounting spindle 20 secures the idler bushing assembly to the frame member 33. The mounting flange 30 includes a further set of apertures 34 for receiving machine screws or the like (not shown) to provide standoff of the idler bushing 12 with respect to the idler pulley 38, or the like carried by the idler bushing 12.

Referring to FIGS. 2, 4, 6 and 7, the inner bushing 14 is generally tubular in shape and has an axial through bore 42. The inner bushing 14 is stepped down at opposite ends thereof, defining reduced diameter end portions 44 and 46. The inner bushing 14 has a radial bore 48 through its sidewall 47 from the outer surface 45 to the through bore 42. The outer diameter of the inner bushing 14 is less than the inner diameter of the through bore of the idler bushing 12. The inner bushing extends within the through bore of the idler bushing with an outer surface 45 of the inner bushing 14 spaced apart from of the inner surface 23 of the idler bushing, defining a lubricant passageway 49 between the inner surface 23 of the idler bushing 12 and the outer surface 45 of the inner bushing 14. In one embodiment, the lubricant passageway 49 is annular in cross section and extends substantially the length of the inner bushing 14.

The idler bushing 12 is journaled on the inner bushing 14 by the bearings 16 and 18 which can be located at or near opposite ends of the bushings. In one embodiment, the bearings 16 and 18 are ball bearings having an inner race 17 and an outer race 19 with ball bearings 21 captured between the inner and outer races. The inner diameter of the bearings 16 and 18 corresponds to the outer diameter of the reduced diameter end portions 44 and 46 of the inner bushing 14. The outer diameter of the bearings 16 and 18 corresponds to the inner diameter of the recesses 24 and 26 at opposite ends of the idler bushing 12. In one embodiment, the bearings 16 and 18 are located in recesses defined by the countersunk portions of the idler bushing 12 and the reduced diameter portions of the inner bushing 14.

Figure 8:
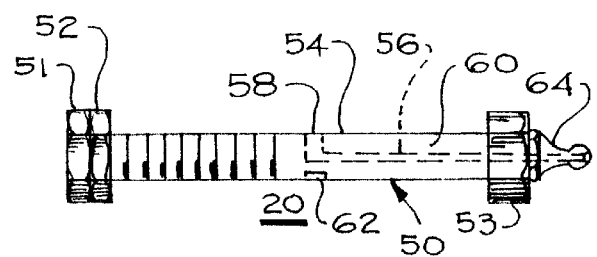
FIG. 8 is a section view a spindle of the idler bushing assembly of FIG. 1.

Referring to FIGS. 2, 4 and 8, in one embodiment, the mounting spindle 20 includes a bolt 50 and nuts 51 and 52. The bolt 50 includes a head portion 53 and a shaft portion 54, a portion of which is threaded to receive the nuts. The shaft portion 54 of the bolt 50 is dimensioned to be received in the axial through bore 42 of the inner bushing 14. The bolt 50 and nuts 51 and 52 can be used for securing the idler bushing assembly 10 to a suitable mounting or support surface, such as a frame member 33 (FIG. 9) of a machine or other apparatus with which the idler bushing assembly 10 is used.

The idler bushing assembly 10 is provided with a capability for relubicating the bearings 16 and 18. To this end, the bolt 50 has an axial bore or passageway 56 extending along a part of the shaft portion 54 from the head portion 53 to a location approximately one-third to one-half the length of the shaft portion 54 of the bolt 50. A radial bore 58 communicates the interior passage provided by axial passageway 56 with the outer surface 60 of the bolt 50. The radial bore 58 is communicated with the radial bore 48 in the inner bushing 14 by an annular groove 62 (FIGS. 2 and 8) in the outer surface 60 of the bolt 50. The annular groove 62 extends around the circumference of the bolt. The annular groove 62 is located in fluid communication with the radial bore 58 as shown in FIG. 2. Thus, in one embodiment, the axial passageway 56 is communicated with the lubricant passageway along a fluid flow path that includes the radial bore 58 of the bolt 50, the annular groove 62 in the outer surface of the bolt, and the radial bore 48 of the inner bushing 14. The annular groove 62 ensures that the radial bore 58 of bolt 50 is in fluid communication with-the radial bore 48, regardless of the relative rotational position of inner bushing 14 and bolt 50 and thus of the radial bores 48 and 58 of inner bushing 14 and bolt 50.

In one embodiment, the head portion 53 of the bolt So is drilled and tapped and fitted with a conventional grease fitting 64, such as a Zerk fitting which is communicated with the axial bore 56. Thus, grease, or some other suitable lubricant, under pressure, can be forced into the idler bushing assembly 10 by way of the grease fitting 64, and forced through the axial bore or passage 56 and the radial bore 58 of the bolt 50, and the radial passage 48 in the inner bushing 14 of the idler bushing assembly 10 into the lubricant passageway 49. The lubricant passageway 49 is aligned with the split between the inner and outer races 17 and 19 of the bearing assemblies 16 and 18 as shown in FIG. 4, for example. Lubricant can be forced under pressure into the lubrication passageway 49 of the idler bushing assembly 10 to recharge the bearings 16 and 18 of the idler bushing 12 with the lubricant. Although the grease fitting 64 is shown located in the head portion of the bolt 50, the grease fitting can be located in other places as long as it is communicated with the interior passageway defined by the axial bore 56 of the bolt 50.

Referring to FIG. 9, by way of illustration of one application of the idler bushing assembly 10, the idler bushing assembly 10 is shown mounting an idler sprocket or pulley 38. The idler pulley 38 is mounted on the hub 27 of the idler bushing 12. The idler bushing assembly 10 is adapted for mounting to a frame member 33 or the like of the machinery with which it is used. The idler bushing 12 and the pulley mounted thereon rotate freely with respect to the frame member 33.

Referring also to FIG. 4, briefly, to recharge, grease or some other suitable lubricant is applied under pressure by conventional means through the grease fitting 64, entering the bore or passageway 56 and being forced outwards or externally through radial bore 58 and annular groove 62 (only a portion of which is shown in FIG. 4), and through the radial opening 48 in the inner bushing 14 and lubrication passageway 49 to the bearing area proper, i.e., the locations of the bearings 16 and 18. The components are sized to provide space, i.e., the lubrication passageway 48, for the passage of lubricant generally axially along the outer surface of the inner bushing 14 from opening 48 in the outer surface of the inner bushing 14 to the bearing area proper.

While a particular embodiment of the invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention.

What is claimed is:

1. A relubricatable idler bushing assembly comprising:
   an idler bushing having an axial through bore defining an inner surface for the idler bushing;
   an inner bushing extending within the through bore, the inner bushing having first and second end portions of a reduced diameter and an outer surface of the inner bushing intermediate said first and second reduced diameter ends spaced apart from the inner surface of the idler bushing, defining a lubricant passageway, the inner bushing having an axial through bore; and
   a spindle dimensioned to be received within the through bore of the inner bushing, the spindle having an axial passageway therein and a radial bore communicating the axial passageway with the outer surface of the spindle, one end of the spindle being adapted for supplying lubricant under pressure to the axial passageway, the axial passageway being in fluid communication with the lubricant passageway along a fluid flow path defined in part by the inner bushing, and
   first and second bearings interposed between the idler bushing and the inner bushing permitting relative rotational movement between the idler bushing and the inner bushing, the first and second bearings being in fluid communication with the lubricant passageway,
   the first and second reduced diameter ends of the inner bushing cooperating with ends of the through bore of the idler bushing to define first and second recesses for locating the first and second bearings, respectively.

2. The relubricatable idler bushing assembly according to claim 1, wherein the ends of the through bore of the idler bushing are countersunk, defining first and second recesses, respectively, at opposite ends of the idler bushing, at least a portion of the first and second bearings being located in the first and second recesses, respectively.

3. A relubricatable idler bushing assembly comprising:
   an idler bushing having an axial through bore, defining an inner surface for the idler bushing;

an inner bushing extending within the through bore of the idler bushing with an outer surface of the inner bushing spaced apart from the inner surface of the idler bushing, defining a generally annular lubricant passageway, the inner bushing having a through bore and a radial bore extending from the through bore of the inner bushing to the lubricant passageway;

first and second bearings interposed between the inner bushing and the idler bushing for supporting the idler bushing near the first and second ends thereof to allow relative rotational movement between the idler bushing and the inner bushing, the first and second bearings being disposed in fluid communication with the lubricant passageway; and a spindle dimensioned to be received within the inner bushing, the spindle having an axial passageway therein and a radial bore communicating the axial passageway with the exterior of the spindle, and one end of the spindle being adapted for supplying lubricant under pressure to the axial channel, and the axial passageway being communicated with the lubricant passageway along a flow path including at least the radial bore of the spindle and the radial bore of the inner bushing.

4. The relubricatable idler bushing assembly according to claim 3, wherein the spindle includes an annular groove extending circumferentially around the outer surface of the spindle communicating the radial bore of the spindle with the radial bore in the inner bushing.

5. The relubricatable idler bushing assembly according to claim 3, wherein the through bore of the idler bushing is countersunk at opposite ends thereof, defining first and second recesses in which the first and second bearings, respectively, are located.

6. The relubricatable idler bushing assembly according to claim 3, wherein said one end of the spindle includes a lubrication fitting for supplying lubricant to the axial passageway.

7. The combination comprising:

a quick disconnect idler bushing having a through bore, the idler bushing having a hub dimensioned to receive an idler pulley;

an inner bushing extending within the through bore of the idler bushing, the inner bushing having first and second ends and a through bore extending between the first and second ends, and the inner bushing having a radial bore extending from the through bore of the inner bushing to the external surface of the inner bushing, the radial bore being communicated with a lubricant passageway defined in part by the inner bushing; and a spindle dimensioned to be received within the through bore of the inner bushing, the spindle having an axial passageway therein and a radial bore communicating the axial passageway with the exterior of the spindle, and an annular groove extending around the outer periphery of the spindle, the annular groove being communicated with the lubricant passageway through the radial bore in the inner bushing, one end of the spindle being adapted for supplying lubricant under pressure to the axial passageway of the spindle, and the axial passageway of the spindle being communicated with the lubricant passageway along a path including at least the radial bore of the spindle, the annular groove of the spindle, and the radial bore of the inner bushing, wherein the ends of the through bore of the idler bushing are countersunk, defining first and second recesses at opposite sides of the idler bushing, and first and second bearings are received in the first and second recesses, respectively, for journaling the idler bushing on the inner bushing.

8. The combination of claim 7, wherein the spindle comprises a mounting bolt for coupling the inner bushing to a support.

9. The combination of claim 7, wherein the idler bushing has inner surface, and the inner bushing has an outer surface opposing the inner surface of the idler bushing and spaced apart from the inner surface of the idler bushing, defining the lubricant passageway.

10. The combination comprising:

an idler pulley; and an idler bushing assembly, said idler bushing assembly including an idler bushing having a through bore, the idler bushing having a hub dimensioned to receive the idler pulley;

an inner bushing extending within the through bore of the idler bushing, the inner bushing having first and second ends and a through bore extending between the first and second ends, and the inner bushing having a radial bore extending from an inner surface of the inner bushing to an outer surface of the inner bushing, the radial bore being in fluid communication with a lubricant passageway defined in part by the inner bushing; and a spindle dimensioned to be received within the through bore of the inner bushing, the spindle having an axial passageway therein and a radial bore communicating the axial passageway of the spindle with the exterior of the spindle, and an annular channel extending around the periphery of the spindle, the annular channel communicating with the radial bore in the inner bushing, one end of the spindle being adapted for supplying lubricant under pressure to the axial passageway, and the axial passageway being communicated with the lubricant passageway over a fluid flow path including at least the radial bore of the spindle and the radial bore of the inner bushing.

11. The combination of claim 10, and including first and second bearings interposed between the idler bushing and the inner bushing for permitting relative rotational movement between the idler bushing and the inner bushing, the first and second bearings being disposed in fluid communication with the lubricant passageway.

12. The combination of claim 10, wherein the idler bushing has an inner surface, the outer surface of the inner bushing being spaced apart from the inner surface of the idler bushing, defining the lubricant passageway.

13. The combination comprising:

an idler bushing having a through bore, the idler bushing having a hub dimensioned to receive an idler member;

an inner bushing extending within the through bore of the idler bushing, the inner bushing having first and second ends and a through bore extending between the first and second ends, and the inner bushing having a radial bore extending from the through bore of the inner bushing to the external surface of the inner bushing, the radial bore being communicated with a lubricant passageway defined in part by the inner bushing; and a spindle dimensioned to be received within the through bore of the inner bushing, the spindle having an axial passageway therein and a radial bore communicating the axial passageway with the exterior of the spindle, and an annular groove extending around the outer periphery of the spindle, the annular groove being communicated with the lubricant passageway through the radial bore in the inner bushing, one end of the spindle being adapted for supplying lubricant under pressure to the axial passageway of the spindle, and the axial passageway of the spindle being communicated with the lubricant passageway along a path including at least the radial bore of the spindle, the annular groove of the spindle, and the radial bore of the inner bushing, wherein the ends of the through bore of the idler bushing are countersunk, defining first and second recesses at opposite sides of the idler bushing, and including first and second bearings for journaling the idler bushing on the inner bushing, at least a portion of the first and second bearings located in the first and second recesses, respectively.

14. The combination comprising:

an idler member; and an idler bushing assembly, said idler bushing assembly including an idler bushing having a through bore, the idler bushing having a hub dimensioned to receive the idler member;

an inner bushing extending within the through bore of the idler bushing, the inner bushing having first and second ends and a through bore extending between the first and second ends, and the inner bushing having a radial bore extending from an inner surface of the inner bushing to an outer surface of the inner bushing, the radial bore being in fluid communication with a lubricant passageway defined in part by the inner bushing; and a spindle dimensioned to be received within the through bore of the inner bushing, the spindle having an axial passageway therein and a radial bore communicating the axial passageway of the spindle with the exterior of the spindle, and an annular channel extending around the periphery of the spindle, the annular channel communicating with the radial bore in the inner bushing, one end of the spindle being adapted for supplying lubricant under pressure to the axial passageway, and the axial passageway being communicated with the lubricant passageway over a fluid flow path including at least the radial bore of the spindle and the radial bore of the inner bushing.

\* \* \* \* \*